United States Patent
Kaynak et al.

(10) Patent No.: US 12,537,542 B1
(45) Date of Patent: Jan. 27, 2026

(54) ERROR-HANDLING WITH MULTIPLE LEVELS OF DECODERS

(71) Applicant: MICRON TECHNOLOGY, INC., Boise, ID (US)

(72) Inventors: Mustafa N. Kaynak, San Diego, CA (US); Patrick R. Khayat, San Diego, CA (US); Sivagnanam Parthasarathy, Carlsbad, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

(21) Appl. No.: 18/783,926

(22) Filed: Jul. 25, 2024

(51) Int. Cl.
*H03M 13/00* (2006.01)
*H03M 13/11* (2006.01)
*H03M 13/39* (2006.01)

(52) U.S. Cl.
CPC ... *H03M 13/1102* (2013.01); *H03M 13/3927* (2013.01)

(58) Field of Classification Search
None
See application file for complete search history.

(56) References Cited

U.S. PATENT DOCUMENTS

| | | | |
|---|---|---|---|
| 7,370,265 B2 | 5/2008 | Shen et al. | |
| 8,230,298 B2 | 7/2012 | Tran et al. | |
| 8,230,312 B1 | 7/2012 | Yeo et al. | |
| 8,549,387 B2 | 10/2013 | Lee | |
| 12,050,514 B1* | 7/2024 | Steiner | H03M 13/152 |
| 2019/0361606 A1* | 11/2019 | Goker | H03M 13/373 |
| 2023/0081623 A1* | 3/2023 | Hsu | G11C 29/38 |
| | | | 714/768 |
| 2023/0111033 A1* | 4/2023 | Oh | G11C 16/0483 |
| | | | 365/185.17 |

* cited by examiner

Primary Examiner — Mujtaba M Chaudry
(74) Attorney, Agent, or Firm — Tarolli, Sundheim, Covell & Tummino LLP

(57) ABSTRACT

A method for decoding data includes determining, by an error-handling module of a controller, that a hard read of a first codeword hard read from a first wordline has errors responsive to a first-level low density parity check (LDPC) decoder failing to correct the errors of the first codeword. The controller executes a hard read of a second wordline to provide a hard read of an extra parity portion for the first codeword. The error-handling module forms a second codeword based on the hard read of the first codeword and the hard read of the extra parity portion. The error-handling module inputs the second codeword into a second-level LDPC decoder. The second-level LDPC decoder attempts to decode the second codeword in response to the inputting. The error-handling module stores a corrected codeword based on the second codeword in response to determining that the second codeword has no errors.

20 Claims, 5 Drawing Sheets

ERROR-HANDLING WITH MULTIPLE LEVELS OF DECODERS

TECHNICAL FIELD

This disclosure relates to a multi-tier error-handling to correct errors in data.

BACKGROUND

A memory sub-system includes a memory device designed for data storage. These memory devices are implemented as non-volatile and volatile memory devices in various examples. In some such examples, a host system employs a memory sub-system for the purposes of storing data on the memory devices and for retrieving data from the memory devices.

A wordline in not-AND (NAND) flash memory and other similar storage technologies refers to a horizontal line of cells within a memory array, connected by a common gate line that controls the access to these cells. Activation of a given wordline enables the reading, writing or erasing of data in all the cells along the given wordline contemporaneously. The structure of a wordline enables addressing and manipulating data efficiently in a memory device (e.g., a memory chip). In particular, the structure of the wordline allows entire rows of cells to be accessed through a single control signal, enabling tuning of the operations for speed and consistency in large-scale data storage environments.

DETAILED DESCRIPTION

Figure 1A:
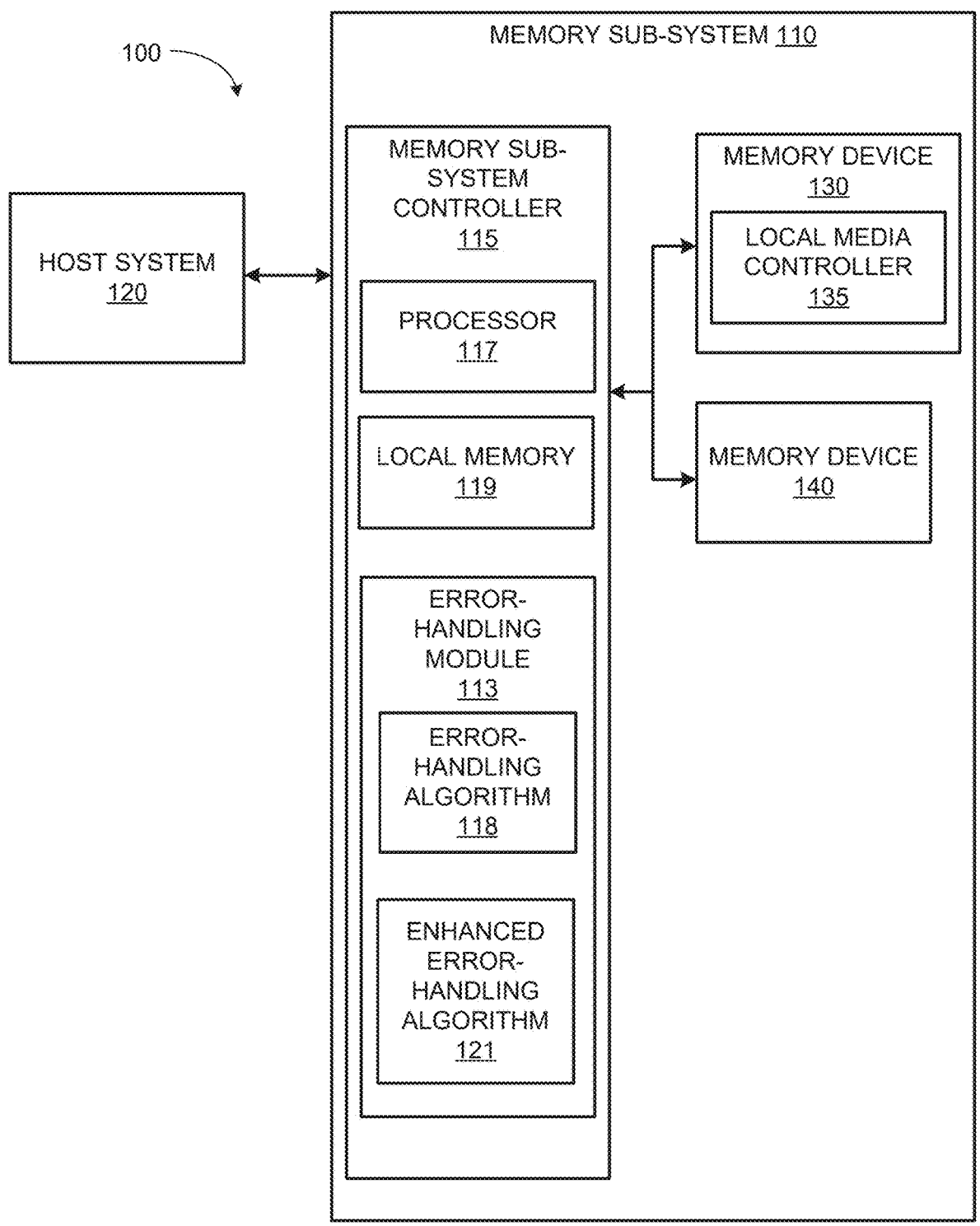
FIG. 1A illustrates a system for decoding data from a memory sub-system.

This description relates to error correction operations in memory systems, specifically focusing on the strategic delay of soft reads until after hard reads have failed to correct errors. These error correction operations include performing a hard read of a first codeword from a memory device and applying a first level of error correction with the first codeword. If this initial correction fails, enhanced error correction operations are initiated to execute a hard read of an extra parity portion for the first codeword and a second level of error correction is applied on a second codeword formed of the first codeword and the extra parity portion. If the second level of error correction fails, a soft read of the first codeword is executed, and the second level of error correction is applied to a version of the second codeword that includes data from the soft read of the first codeword and the hard read of the extra parity portion. If the error correction of the soft read of the first codeword and the hard read of the extra parity portion fails, a soft read of the extra parity portion is executed, and the second level of error correction is applied to the soft read of a version of the second codeword that includes data from the soft read of the first codeword and data from the soft read of the extra parity portion. This approach improves the error correction process by curtailing unnecessary soft read operations, thereby enhancing the efficiency and effectiveness of memory systems, particularly in handling codewords from weak wordlines where errors are more frequent.

More generally, this description relates to systems and methods for implementing a multilevel Low-Density Parity-Check (LDPC) error correction scheme in a memory sub-system designed to enhance the quality of service (QoS) and reduce decode latency in NAND flash memory, particularly for weak wordlines. Some examples of a memory sub-system include high density non-volatile memory devices where retention of data is desired during intervals of time where no power is supplied to the memory device. One example of non-volatile memory devices is a not-AND (NAND) memory device. A non-volatile memory device is a package that includes a die(s). Each such die can include a plane(s). For some types of non-volatile memory devices (e.g., NAND memory devices), each plane includes a set of physical blocks, and each physical block includes a set of pages. Each page includes a set of memory cells, which are commonly referred to as cells. A cell is an electronic circuit that stores information. A cell stores at least one bit of binary information and has various logic states that correlate to the number of bits being stored. The logic states are be represented by binary values, such as '0' and '1', or as combinations of such values, such as '00', '01', '10' and '11'.

A memory device includes multiple cells arranged in a two-dimensional or a three-dimensional grid. In some examples, memory cells are formed on a silicon wafer in an array of columns connected by conductive lines (also referred to as bitlines, or BLs) and rows connected by conductive lines (also referred to as wordlines or WLs). A wordline has a row of associated memory cells in a memory device that are used with a bitline or multiple bitlines to generate the address of each of the memory cells. The intersection of a bitline and a wordline defines an address of a given memory cell.

A block refers to a unit of the memory device used to store data. In various examples, the unit could be implemented as a group of memory cells, a wordline group, a wordline or as individual memory cells. Multiple blocks are grouped together to form separate partitions (e.g., planes) of the memory device to enable concurrent operations to take place on each plane. A solid-state drive (SSD) is an example of a memory sub-system that includes a non-volatile memory device(s) and a memory sub-system controller to manage the non-volatile memory devices.

The memory sub-system controller is configured/programmed encode the host and other data, as part of a write operation, into a format for storage at the memory device(s). Encoding refers to a process of generating parity bits from embedded data (e.g., a sequence of binary bits) using an error correction code (ECC) and combining the parity bits to the embedded data to generate an LDPC codeword. LDPC encoding refers to an encoding method that utilizes an LDPC code to generate the parity bits, which can be referred to as a parity portion. User data (e.g., embedded data) is combined with the parity portion to form the LDPC codeword, which may alternatively be referred to as simply a codeword.

The LDPC code is defined by, among other things, a sparse parity-check matrix, alternatively referred to as an H matrix, denoted as $\bar{H}$. Each row of the H matrix embodies a linear constraint imposed on a designated subset of data bits.

Entries within the H matrix, either '0' or '1', signify the participation of individual data bits in each constraint. Stated differently, each row of the H matrix represents a parity-check equation, and each column corresponds to a bit in the codeword. During encoding, the user data (embedded data) is multiplied by the generator matrix which is the inverse of the H matrix associated with a chosen LDPC code to generate parity bits, which are referred to as the parity portion. The generated parity portion is appended to the user data to generate the codeword (LDPC codeword). Thus, the codeword includes the user data and the parity portion, allowing for identification and rectification of errors. The codeword is storable at the memory device(s) of the memory sub-system.

Additionally, the memory sub-system controller can decode codewords, as part of a read operation, stored at the memory device(s) of the memory sub-system. Decoding refers to a process of reconstructing the original user data (e.g., sequence of binary bits embedded in the codeword) from the codeword received from storage at the memory device(s). LDPC decoding refers to a decoding method that utilizes the LDPC code to reconstruct the original user data (embedded data).

Initially, during LDPC decoding, the codeword (an LDPC codeword) is compared with the expected relationships encoded in the H matrix. In particular, the codeword is multiplied by a transpose of the H matrix associated with the LDPC code used to encode the codeword. This operation can also be performed without making a matrix multiplication by sequentially checking each parity using XOR operations. The result of the multiplication, if executed, produces a vector (e.g., a syndrome vector), in which each element corresponds to a specific parity-check equation in the sparse parity-check matrix. A syndrome vector with a zero value signifies that the corresponding parity-check equation is satisfied (e.g., no errors or having even number of bit errors in the parity check equation), and a syndrome vector with a non-zero value indicates potential errors impacting the bits involved in the corresponding parity-check equation. Potential errors, for example, may be due to the bits involved in the corresponding parity-check equation being flipped due to noise, interference, distortion, bit synchronization errors or errors from the media itself (both intrinsic and extrinsic). For example, a bit that may have originally been stored as a '0' may be flipped to a '1' or vice versa. The decoding process for LDPC codes are based on the syndrome vector, such as LDPC codes used in the memory sub-systems.

Read operations can be hard reads (1H) or soft reads (1H2S). A hard read (1H) is formed of hard bits. The "hard bit" in this context is a binary read of data where each bit is read and immediately interpreted as either a '0' or a '1', based on a fixed threshold. For example, in NAND flash memory, a voltage level above a certain threshold voltage ($V_t$) might be interpreted as '0', and below that threshold as '1'. Hard reads (1H) are quick and require less computational power than soft reads (1H2S).

Soft reads (1H2S) are a combination of a hard bit and soft bits. The "soft bits" provide additional information about the probability or confidence level of the bit being a '0' or '1'. This additional information can be represented in terms of likelihoods or probabilities, which can be converted into LLRs for use in decoding algorithms. Soft reads (1H2S) are employable in error correction because soft reads (1H2S) allow a decoder algorithm of the error-handling module 113 to make more informed decisions based on the degree of certainty about each bit's state. The combination of 1H2S forming the soft read is effective in systems where both speed and data integrity are considered. The hard read forming the hard bit provides a quick initial assessment of each bit, and the soft bits offer deeper insights into the potential errors, enhancing the error correction capability of a decoder.

In response to detection of the potential errors, an algorithm of the LDPC decoding, such as a MinSum (alternatively referred to as min-sum) algorithm, iteratively analyzes the LDPC codeword and estimates the most likely values for the data bits. In particular, the algorithm of the LDPC decoding (e.g., decoding algorithm) is initialized with either hard decisions and/or soft decisions of the LDPC codeword. Hard decisions refer to binary decisions made about the LDPC codeword, where each bit is classified as either '0' or '1' based on a threshold. Soft decisions refer a likelihood or confidence score indicating how likely each bit is to be classified as either '0' or '1'. In some instances, soft decisions may be represented as a log-likelihood ratio (LLR) set, in which each LLR of the LLR set is a value that indicates a likelihood or confidence score of a bit of the LDPC codeword to be classified as either '0' or '1'. Moreover, in some examples, the hard decisions are represented with a selected value of the LLR set. The LLR is a ratio of the probabilities of receiving a particular signal given the bit is '0' versus the bit being '1' or vice versa. A positive LLR (e.g., a positive value) indicates that '0' is a more likely decision, whereas a negative LLR (e.g., a negative value) indicates that '1' is a more likely decision. The magnitude of the LLR indicates the confidence in this decision. A higher magnitude (or larger value) suggests higher confidence in the decision.

Multilevel LDPC coding is an error correction scheme designed to enhance the reliability and performance of data storage and communication systems, particularly in environments that employ NAND flash memory where error rates can vary significantly. Multilevel LDPC involves using different sets or "levels" of LDPC codes, each tailored to different error conditions or reliability requirements within the device. This approach allows for adaptation to varying error characteristics across different parts of the memory array or during different operational conditions.

In an example multilevel LDPC scheme, a first-level LDPC decoder is employable for general error correction across most wordlines, providing adequate correction for standard error rates under normal conditions, including wordlines that are categorized as strong wordlines or medium wordlines (wherein "strong" and "medium" indicate a propensity of errors). However, for weak wordlines that are inherently more prone to errors (e.g., due to physical defects or degradation over time) a second-level LDPC decoder with stronger error correction capabilities is employed. This second-level LDPC decoder handles higher error rates and more complex error patterns, ensuring data integrity where the first-level might be insufficient. By employing such a tiered approach, multilevel LDPC schemes can be tuned for both performance and reliability, using more complex and computationally intensive error correction when needed, thereby balancing efficiency and robustness. In particular, only a select set of weak wordlines uses second-level LDPC. The parity portion for the first-level LDPC is stored in the same page and wordline as with the user data. For the second-level LDPC, the additional parity for multiple codewords on the weak wordline is gathered and stored on the same wordline in a different page or on a different wordline. This codeword is called as extra-parity portion as the user data portion of this codeword is made of additional parity for multiple codewords on the weak wordline. Therefore, accessing second level parity includes an additional page read.

To initiate the decoding process, a controller (e.g., a memory sub-system controller) executes a hard read (1H) of a first codeword [U(1H),P1(1H)] (codeword-1) from a memory device (e.g., NAND flash memory). The hard read (1H) of the memory device is formed of hard bits, and the first codeword includes user data [U] and a parity portion [P1] formed of parity bits.

Throughout this description, the nomenclature of a square bracket [ ], such as the reference to the "first codeword [U(1H),P1(1H)]" indicates the constituent components of a particular data structure. For instance, the user data [U] and the parity portion [P1] are read with a hard read, as indicated by the parentheses (1H). Similarly, if the user data [U] and the parity portion [P1] were made with soft reads, the information in the parentheses would be denoted as (1H2S), such that a soft read of the first codeword [U,P1] would be denoted as the first codeword [U(1H2S),P1(1H2S)]. Thus, different versions of the same data structure are denoted with different information inside the square brackets [ ]. Further, in situations where a data structure is provided, but no such information is included in parentheses ( ), such as in a case of referencing the "first codeword [U,P1]", the referenced data structure refers to any method that the particular data structure was read. It is noted that for soft information, more coarse such as 1H1S or finer granularity such as 1H3S, 1H4S is alternatively employable. In 1HNS notation, N refers to the number of additional NAND page soft reads executed on top of the hard read to extract soft information. The higher N, the finer granularity the soft information is and the higher the read time. Hence, there is a tradeoff between granularity of the soft information and the read time.

The controller calculates a syndrome vector which indicates that the codeword includes errors. If the syndrome vector is equal to zero, it is presumed that the codeword contains no errors. Accordingly, in this situation, the hard read (1H) of the first codeword [U(1H),P1(1H)] can be stored in local memory, such that user data [U] can be extracted from the first codeword [U(1H),P1(1H)] and provided to an external system. However, in situations where the syndrome vector is not equal to zero, the hard read (1H) of the first codeword [U(1H),P1(1H)] has errors.

Responsive to detecting the presence of errors, the controller initiates an error-handling algorithm. The error-handling algorithm executes a first-level LDPC decoder with a first H matrix on the hard read (1H) of the first codeword [U(1H),P1(1H)]. In situations where the first-level LDPC decoder is able to correct the errors in the hard read (1H) of the first codeword [U(1H),P1(1H)] without exceeding a decoding threshold, the controller stores the (corrected) first codeword [U(1H),P1(1H)] in the local memory, such that user data [U] from the hard read (1H) of the first codeword [U(1H),P1(1H)] can be provided to the external system. The decoding threshold could be a threshold number of iterations, a computational time, etc.

Conversely, if the error-handling algorithm is unable to correct the errors in the hard read (1H) of the first codeword [U(1H),P1(1H)], the controller executes an enhanced error-handling algorithm. The enhanced error-handling algorithm is a multitier algorithm, where lower tiers are faster in execution time to decode user data [U], but have less correction capability, and upper tiers have more correction capability, but these upper tiers need execution of more computationally expensive error correction operations to decode user data [U].

In a first-tier of enhanced error-handling operations executed by the enhanced error-handling algorithm 121, also known as shallow enhanced error-handling operations, the enhanced controller executes a hard read (1H) of an extra parity portion [P2(1H)] for the first codeword (U,P1) from potentially a different wordline. In some examples, the hard read (1H) of the extra parity portion [P2(1H)] is read from a different memory device than the hard read (1H) of the first codeword [U(1H),P1(1H)]. That is, the extra parity portion [P2] and the first codeword [U,P1] reside on different memory devices in some examples. The system stores the extra parity portion [P2(1H)] in memory for possible future use in error handling flow. The enhanced correction algorithm combines the user data [U(1H)] and the parity portion [P1(1H)] of the hard read (1H) of the first codeword [U(1H),P1(1H)] with the extra parity portion [P2(1H)] to form a first version of the second codeword [U(1H),P1(1H),P2(1H)], namely codeword-2. The enhanced error-handling algorithm executes a second-level LDPC decoder with a second H matrix on the second codeword [P1(1H),P1(1H),P2(1H)]. The second H matrix has more parities to correct the errors (i.e., more parity overhead) and hence the second-level LDPC decoder is more robust with respect to error correction than the first-level LDPC decoder, with a cost of increased computational time. In situations where the second-level LDPC decoder is able to correct the errors in the first version of the second codeword [U(1H),P1(1H),P2(1H)] without exceeding a shallow enhanced decoding threshold defining a number of iterations (or some other threshold), the controller stores the (correct) first version of the second codeword [U(1H),P1(1H),P2(1H)] in the local memory, such that corrected user data [U] from the first version of the second codeword [U(1H),P1(1H),P2(1H)] can be provided to the external system.

Conversely, if the first-tier of enhanced error-handling operations is unable to correct the errors in the first version of the second codeword [U(1H),P1(1H),P2(1H)], the enhanced error-handling algorithm initiates a second-tier of the enhanced error-handling operations, also referred to as semi-deep enhanced error-handling operations. In the second-tier of the enhanced error-handling operations, the controller executes a soft read (such as 1H2S) of the first codeword [U(1H2S),P1(1H2S)]. As noted, the soft read (1H2S) of the first codeword [U(1H2S),P1(1H2S)] is a combination of hard bits for the user data [U] and the parity portion [P1] and soft bits for the user data [U] and the parity portion [P1].

Continuing in the second-tier, the enhanced error-handling algorithm forms a second version of the second codeword [U,P1,P2] with a combination of the soft read of user data [U(1H2S)] and the parity portion [P1(1H2S)] and the hard read of the extra parity portion [P2(1H)] which does not need a read from a memory device such as NAND because the extra parity portion [P2(1H)] is stored in controller memory (e.g., local memory). These operations update the first version of the second codeword to [U(1H),P1(1H),P2(1H)] to form the second version of the second codeword [U(1H2S),P1(1H2S),P2(1H)]. In this situation, the second-level LDPC decoder is re-executed with the second version of the second codeword [U(1H2S),P1(1H2S),P2(1H)] as the input. In situations where the second-level LDPC decoder is able to correct the errors in the second version of the second codeword [U(1H2S),P1(1H2S),P2(1H)] without exceeding a semi-deep enhanced decoder threshold that could be number of iterations (or some other threshold), the controller stores the (corrected) second codeword [U(1H2S),P1(1H2S),P2(1H)] in the local memory, such that corrected user data [U] from the second version of the second codeword [U(1H2S),P1(1H2S),P2(1H)] can be provided to the external system.

Conversely, if the enhanced error-handling algorithm is still unable to correct the errors in the second version of the second codeword [U(1H2S),P1(1H2S),P2(1H)], the enhanced error-handling algorithm initiates a third-tier of enhanced error-handling operations, alternatively referred to as deep enhanced error-handling operations. In the third-tier, the controller executes a soft read of the extra parity portion [P2(1H2S)]. In the third-tier, the enhanced error-handling algorithm updates the second version of the second codeword [U(1H2S),P1(1H2S),P2(1HS2)] with a combination of the soft bits of user data [U(1H2S)] and the parity portion [P1(1H2S)] and soft bits of the extra parity portion [P2(1H2S)] to form a third version of the second codeword [U(1H2S),P1(1H2S),P2(1H2S)]. In this situation, the second-level LDPC decoder is re-executed with the third version of the second codeword [U(1H2S),P1(1H2S),P2(1H2S)] as the input. In situations where the second-level LDPC decoder is able to correct the errors in the third version of the second codeword [U(1H2S),P1(1H2S),P2(1H2S)] without exceeding a deep enhanced decoder threshold that could define a number of iterations (or some other threshold), the controller stores the (corrected) third version of the second codeword [U(1H2S),P1(1H2S),P2(1H2S)] in the local memory, such that corrected user data [U] from the third version of the second codeword [U(1H2S),P1(1H2S),P2(1H2S)] can be provided to the external system. In situations where the second-level LDPC decoder is unable to decode the user data [U], based on the third version of the second codeword [U(1H2S),P1(1H2S),P2(1H2S)] the read operation is failed or a different operation is executed.

By use of the enhanced error-handling algorithm, the memory sub-system improves efficiency. In particular, hard reads (1H) are strategically employed to read the first codeword [U(1H),P1(1H)] and the first version of the second codeword [U(1H),P1(1H),P2(1H)], and these versions of the first codeword [U(1H),P1(1H)] and the second codeword [U(1H),P1(1H),P2(1H)] are employed for LDPC decoding prior to executing soft reads (1H2S). Thus, by employing the enhanced error-handling algorithm, computationally expensive soft reads (1H2S) of the first codeword [U(1H2S),P1(1H2S)] and the extra parity portion [P2(1H2S)] are deferred until needed, thereby increasing throughput of the memory subsystem.

FIG. 1A illustrates a system 100 that includes a memory sub-system 110 that can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card and a hard disk drive (HDD). Examples of memory modules include a dual in-line memory module (DIMM), a small outline DIMM (SO-DIMM) and various types of non-volatile dual in-line memory modules (NVDIMMs).

The system 100 can be a computing device such as a desktop computer, laptop computer, network server, mobile device, a vehicle (e.g., airplane, drone, train, automobile or other conveyance), Internet of Things (IoT) enabled device, embedded computer (e.g., one included in a vehicle, industrial equipment or a networked commercial device) or such computing device that includes memory and a processing device. The system 100 can include a host system 120 that is coupled to one or more memory sub-systems 110. In some examples, the host system 120 is coupled to different types of the memory sub-system 110. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller) and a storage protocol controller (e.g., PCIe controller, SATA controller, CXL controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a compute express link (CXL) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., memory device(s) 130) when the memory sub-system 110 is coupled with the host system 120 by the physical host interface (e.g., PCIe or CXL bus). The physical host interface can provide an interface for passing control, address, data and other signals between the memory sub-system 110 and the host system 120. FIG. 1A illustrates a memory sub-system 110 as an example. In general, the host system 120 can access multiple memory sub-systems via a same communication connection, multiple separate communication connections and/or a combination of communication connections.

The memory device 130 and the memory device 140 are implemented as non-transitory computer readable media. The memory device 130 and the memory device 140 can include any combination of the different types of non-volatile memory devices and/or volatile memory devices. The volatile memory devices (e.g., the memory device 140) can be, but are not limited to, random access memory (RAM), such as dynamic random access memory (DRAM) and synchronous dynamic random access memory (SDRAM).

Some examples of non-volatile memory devices (e.g., memory device(s) 130) include not-AND (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory device(s) 130 include one or more arrays of memory cells. One type of memory cell, for example, single level cells (SLC) can store one bit per cell. Other types of memory cells, such as multi-level cells (MLCs), triple level cells (TLCs) and quad-level cells (QLCs), and penta-level cells (PLC's) or higher, can store multiple bits per cell. In some examples, each of the memory devices 130 can include one or more arrays of memory cells such as SLCs, MLCs, TLCs, QLCs or some combination thereof. In some examples, a particular memory device can include an SLC portion, an MLC portion, a TLC portion and/or a QLC portion of memory cells. The memory cells of the memory devices 130 can be grouped as pages that can refer to a logical unit of the memory device used to store data. In some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not-OR (NOR) flash memory, electrically erasable programmable read-only memory (EEPROM), etc.

A memory sub-system controller 115 (or controller 115 for simplicity) communicates with the memory device(s) 130 to perform operations such as reading data, writing data or erasing data at the memory devices 130 and other such operations. The memory sub-system controller 115 can include hardware such as one or more integrated circuits and/or discrete components, a buffer memory or some combination thereof. The hardware can include a digital circuitry with dedicated (e.g., hard-coded) logic to perform the operations described herein. The memory sub-system controller 115 can be a microcontroller, special purpose logic circuitry (e.g., a field programmable gate array (FPGA), an application specific integrated circuit (ASIC), etc.) or other suitable processor.

The memory sub-system controller 115 can include a processing device, which includes one or more processors (e.g., the processor 117), configured to execute instructions stored in a local memory 119. In the illustrated example, the local memory 119 of the memory sub-system controller 115 includes an embedded memory configured to store instructions for performing various processes, operations, logic flows and routines that control operation of the memory sub-system 110, including handling communications between the memory sub-system 110 and the host system 120. The local memory 119 is a non-transitory computer-readable medium.

In some examples, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another example, a memory sub-system 110 does not include a memory sub-system controller 115 and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations and address translations between a logical address (e.g., a logical block address (LBA), namespace) and a physical address (e.g., physical block address) that are associated with the memory devices 130. The memory sub-system controller 115, for example, may employ a Flash Translation Layer (FTL) to translate logical addresses to corresponding physical memory addresses, which can be stored in one or more FTL mapping tables. In some instances, the FTL mapping table can be referred to as a logical-to-physical (L2P) mapping table storing L2P mapping information. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. For example, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some examples, the memory devices 130 include local media controllers 135 that operate in concert with the memory sub-system controller 115 to execute operations on one or more memory cells of the memory devices 130. An external controller (e.g., the memory sub-system controller 115) can externally manage the memory device 130 (e.g., perform media management operations on the memory device 130). In some examples, the memory sub-system 110 is a managed memory device, which is a raw memory device 130 having control logic (e.g., local media controller 135) on the die and a controller (e.g., the memory sub-system controller 115) for media management within the same memory device package. An example of a managed memory device is a managed NAND (MNAND) device.

The memory device 130 and the memory device 140 are structured to include wordlines. Wordlines are addressable wiring lines that connect and control a row of memory cells in the memory device 130 and the memory device 140. Each wordline addresses the cells in a corresponding row contemporaneously, enabling operations such as reading, writing and erasing data. The memory device 130 and the memory device 140 can be organized into an array of cells arranged in blocks, with each block containing multiple pages. The cells in a page are connected by these wordlines horizontally and bitlines vertically, forming a grid-like structure that allows for efficient data access and management.

During read operations, the memory sub-system controller 115 activates the appropriate wordline for the row where selected data is stored, causing the cells along the wordline to output data to the corresponding bitlines, which are then read by sense amplifiers. For writing data, the memory sub-system controller 115 applies a voltage to the cells along the wordline to change a state of the cells, representing the data being written. Erasing data occurs at the block level, where all wordlines in the block are activated contemporaneously, and a high voltage (e.g., a logical '0') is applied to reset all the cells in the block to a default state. Each activation for reading, writing or erasing gradually wears down the memory cells connected to a wordline, leading to potential wear-out and failure, making the management of wordlines needed for the longevity of the memory device.

Wordlines of the memory device 130 and the memory device 140 can be categorized as "strong", "medium" or "weak" in reference to an associated relative reliability and susceptibility to errors. Strong wordlines exhibit high reliability with low error rates, maintaining performance over many cycles due to superior manufacturing, optimal placement or resilient materials. Conversely, weak wordlines are prone to higher rates of errors and faster degradation, often due to manufacturing variances, physical location within the memory array or higher operational stress. The memory sub-system controller 115 manage these variations by applying more aggressive error-correcting codes (ECC) and wear-leveling algorithms to distribute write and erase cycles evenly, thereby curtailing the impact of weak wordlines and enhancing the overall longevity and reliability of the memory device 130 and/or the memory device 140. In some examples, the local memory 119 includes registers that store data identifying wordlines as strong or weak (or medium in some examples). In such a situation, the local memory can be preprogrammed with the addresses of the weak wordlines of the memory device 130 and the memory device 140. Additionally, the memory sub-system controller 115 can modify these registers to change a status (e.g., from strong to weak) of wordlines that degrade over time.

In various examples, the memory sub-system 110 includes an error-handling module 113 that executes an error-handling algorithm 118 and an enhanced error-handling algorithm 121. The error-handling algorithm 118 executes a first-level LDPC decoder based on hard reads (1H). The error-handling module 113 is configured to activate the enhanced error-handling algorithm 121 in response a determination that the first-level LDPC decoder was unable to correct errors in a codeword within a decoder threshold (e.g., a maximum number of iterations) for a weak wordline. The enhanced error-handling algorithm 121 is a multitiered error-handling algorithm that executes multiple tiers of error-handling using hard reads (1H) and soft reads (such as 1H2S) of a first codeword [U,P1] and an extra parity portion [P2] for the first codeword [U,P1]. In some examples, the memory sub-system controller 115 includes at least a portion of the error-handling module 113. In some examples, the error-handling module 113 is part of the host system 120, an application or an operating system. In other examples, a local media controller 135 includes a portion of the error-handling module 113 and is configured to perform the functionality described herein.

In operation, the host system 120 manages and controls the flow of data between itself and the memory sub-system 110, ensuring efficient data storage and retrieval operations. More generally, the host system 120 employs the memory sub-system 110 to write data to and read data from the memory sub-system 110. For instance, the host system 120 processes these request for reading and/or writing data by interacting with the memory sub-system 110, managing the flow of data to and from the memory device 130 and/or the memory device 140 within the memory sub-system 110. This reading and writing of data enables operation of computing systems where data access and management is needed.

Continuing with examples of operation, suppose that the host system 120 outputs a read memory command to the memory sub-system controller 115. Additionally, suppose that the memory sub-system controller 115 accesses the local memory 119 and determines that the requested data (or some portion thereof) is stored in a weak wordline (a wordline with a relative high error rate, such as an error rate of 0.1% or more).

In response to the read request and to determination that this requested data is stored in a weak wordline, the memory sub-system controller 115 operates in concert with the local media controller 135 to execute a hard read (1H) of the memory cells of the memory device 130 and/or the memory device 140 specified in the read memory command, and at least some of these memory cells are components of the weak wordline. The memory sub-system controller 115 stores retrieved data in the form of a first codeword (codeword-1) formed of user data [U] and a parity portion [P1](e.g., LDPC codewords formed of a combination of embedded data and parity bits) in the local memory 119. The first codeword [U,P1] is composed of hard bits, and this instance of the first codeword can be referenced as the first codeword [U(1H), P1(1H)].

The "hard bits" (e.g., of the first codeword [U(1H),P1 (1H)]) in this context is a binary read of data where each bit is read and immediately interpreted as either a '0' or a '1', based on a fixed threshold. For example, in NAND flash memory, a voltage level above a certain threshold voltage ($V_t$) might be interpreted as '0', and below that threshold as '1'. Hard reads (1H) are quick and require less computational power than soft reads (1H2S) but provide less information about the reliability of the read bit.

The error-handling algorithm 118 employs the hard read (1H) of the first codeword [U(1H),P1(1H)] in a first-level LDPC decoder. The first-level LDPC decoder employs a first H matrix (e.g., a first sparse matrix), and multiplies the hard read (1H) of the first codeword [U(1H),P1(1H)] with a transpose of the first H matrix to provide a syndrome vector. This operation can also be performed without making a matrix multiplication by sequentially checking each parity using XOR operations. If the syndrome vector is equal to zero, the hard read (1H) of the first codeword [U(1H),P1 (1H)] has no errors, and if the syndrome vector is non-zero, the hard read (1H) of the first codeword [U(1H),P1(1H)] has at least one error. In response to the syndrome vector being zero, the error-handling module 113 determines that there are no errors in the hard read (1H) of the first codeword [U(1H),P1(1H)]. Thus, the hard read (1H) of the first codeword [U(1H),P1(1H)] is stored in the local memory 119. In this situation, the user data [U] can be extracted from the hard read (1H) of the first codeword [U(1H),P1(1H)] and provided to the host system 120 in response to the read memory request. In other examples, the entire first codeword [U(1H),P1(1H)] is provided to the host system 120.

Conversely, responsive to the syndrome vector having a non-zero value, the error-handling module 113 determines that the hard read (1H) of the first codeword [U(1H),P1(1H)] has error(s). In such a situation, the error-handling module 113 employs the first-level LDPC decoder to attempt to correct errors in the hard read (1H) of the first codeword [U(1H),P1(1H)]. If the first-level LDPC decoder is able to correct the errors in the hard read (1H) of the first codeword [U(1H),P1(1H)] within the decoder threshold, the (corrected) hard read (1H) of the first codeword [U(1H),P1(1H)] is stored in the local memory 119. In this situation, the user data [U] can be extracted from the (corrected) hard read (1H) of the first codeword [U(1H),P1(1H)] and provided to the host system 120 in response to the read memory request. In other examples, the entire hard read (1H) of the first codeword [U(1H),P1(1H)] is provided to the host system 120. In some examples, prior to attempting to execute a second-level of error correction, the error-handling module 113 may be programmed to execute additional error handling attempts by adjusting read thresholds, executing read level calibration etc. In such examples, if these low-latency operations also fail, then the error-handling module 113 initiates the second-level of error correction.

More particularly, if the first-level LDPC decoder is unable to correct the errors of the hard read (1H) of the first codeword [U(1H),P1(1H)] within the decoder threshold, the error-handling module 113 initiates the enhanced error-handling algorithm 121, which executes the second level of error correction. As noted, the enhanced error-handling algorithm 121 is a multitiered error-handling algorithm that executes multiple stages of error-handling using hard reads (1H) and/or soft reads (1H2S) of the first codeword [U,P1] and the extra parity portion [P2] for the first codeword [U,P1]. The extra parity portion [P2] is formed of additional parity bits that are employable in concert with the parity portion [P1] to form a second codeword [U,P1,P2], which is alternatively referred to as codeword-2. In some examples, the extra parity portion [P2] is stored in a different wordline than the first codeword [U,P1]. For instance, the extra parity portion [P2] is stored in a strong wordline. Further in some examples, the extra parity portion [P2] is stored in a different memory device of the memory sub-system 110, such that the first codeword [U,P1] is stored in the memory device 130 and the extra parity portion [P2] is stored in the memory device 140, in one example.

In a first-tier of enhanced error-handling operations, alternatively referred to as shallow enhanced error handling operations, the enhanced error-handling algorithm 121 is configured to execute a hard read (1H) of the extra parity portion [P2(1H)] which is stored in the local memory 119 for potential future use. Additionally, the enhanced error-handling algorithm 121 combines the hard read (1H) of the first codeword [U(1H),P1(1H)] and the extra parity portion [P2(1H)] to form the first version of the second codeword [U(1H),P1(1H),P2(1H)]. That is, the first version of the second codeword [U(1H),P1(1H),P2(1H)] is formed of data from hard reads (1H) of the memory device 130 and/or the memory device 140. The enhanced error-handling algorithm 121 employs a second-level LDPC decoder to attempt to decode the first version of the second codeword [U(1H),P1(1H),P2(1H)]. The second-level LDPC decoder employs a second H matrix that is less sparse (e.g., more '1's) than the first H matrix. Thus, the second-level LDPC decoder can correct more errors than the first-level LDPC decoder. If the second-level LDPC decoder is able to correct the errors in the first version of the second codeword [U(1H),P1(1H),P2(1H)], the (corrected) first version of the second codeword [U(1H),P1(1H),P2(1H)] is stored in the local memory 119. In this situation, the user data [U] can be extracted from the (corrected) first version of the second codeword [U(1H),P1(1H),P2(1H)] and provided to the host system 120 in response to the read memory request. In other examples, the entire first version of the second codeword [U(1H),P1(1H),P2(1H)] is provided to the host system 120.

If the second-level LDPC decoder is unable to correct the errors of the first version of the second codeword [U(1H),P1(1H),P2(1H)] within a shallow enhanced decoder threshold (e.g., a maximum number of iterations), the enhanced error-handling algorithm 121 activates a second-tier of enhanced error-handling operations, and executes a soft read of the first codeword [U(1H2S),P1(1H2S)]. The soft reads (1H2S) are formed of a combination of hard bits and soft bits and it can be finer or coarser granularity of soft information in various examples. In comparison to "hard bits", the "soft bits" provide additional information about the probability or confidence level of the bit being a '0' or '1'. In the present description, this is represented in terms of likelihoods or probabilities, which can be converted into log-likelihood ratios (LLRs) for use in decoding algorithms. Soft reads (1H2S) are employable in error correction because soft reads (1H2S) allow a decoder algorithm of the error-handling module 113 to make more informed decisions based on the degree of certainty about each bit's state. The combination of 1H2S forming the soft read is effective in systems where both speed and data integrity are considered. The hard read forming the hard bit (1H) provides a quick initial assessment of each bit, and the soft bits (2S) offer deeper insights into the potential errors, enhancing the error correction capability of the decoder algorithm of the error-handling module 113.

Furthermore, soft reads (1H2S) provide an indication of reliability of each bit. In the present examples, it is presumed that the reliability is one of three levels, low medium and high, but in other examples, more or less levels are employable.

For each soft read (1H2S), the reliability of the soft read can be determined by comparing the consistency of the soft bits (2S) with the hard bit (1H) of the soft read (1H2S). Moreover, in other examples, the soft read (1H2S) can be a multibit read that provides a finer resolution. Additionally, other criteria are employable to determine the reliability of bits in various examples.

The enhanced error-handling algorithm 121 combines the hard read (1H) of the extra parity portion [P2(H1)] with the soft read (1H2S) of the first codeword [U(1H2S),P1(1H2S)] to form a second version of the second codeword [U(1H2S),P1(1H2S),P2(1H)]. As shown, the second version of the second codeword [U(1H2S),P1(1H2S),P2(1H)] includes both data from the soft read (1H2S) of the first codeword [U(1H2S),P1(1H2S)] and data from the hard read (1H) of the extra parity portion [P2(1H)].

Additionally, the enhanced error-handling algorithm 121 assigns an LLR for the soft bits of the second version of the second codeword [U(1H2S),P1(1H2S),P2(1H)]. To simplify calculations, the LLRs of the LLR array are integer values that are mapped to specific reliabilities. The particular values can be based for example, on a raw error bit rate (RBER) and a high reliability error rate (HRER) of the memory device 130 and/or the memory device 140

The LLRs for the soft reads (1H2S) of the second version of the second codeword [U(1H2S),P1(1H2S),P2(1H)], namely the user data [U(1H2S)] and the parity portion [P1(1H2S)]) can be selected based on analysis of NAND data. Further, in various examples, the hard reads of the (1H) of the second version of the second codeword [U(1H2S),P1(1H2S),P2(1H)] can be assigned a medium LLR value or a different LLR, which can be referred to as a hard input LLR.

The enhanced error-handling algorithm 121 inputs the second version of the second codeword [U(1H2S),P1(1H2S),P2(1H)] and the LLRs for the bits of the second version of the second codeword [U(1H2S),P1(1H2S),P2(1H)] as decoding parameters for the second-level LDPC decoder. In response, the second-level LDPC decoder attempts to correct the errors of the second version of the second codeword [U(1H2S),P1(1H2S),P2(1H)] using the second H matrix. If the second-level LDPC decoder is able to correct the errors in the second version of the second codeword [U(1H2S),P1(1H2S),P2(1H)], the (corrected) second version of the second codeword [U(1H2S),P1(1H2S), P2(1H)] is stored in the local memory 119. In this situation, the user data [U] can be extracted from the (corrected) second version of the second codeword [U(1H2S),P1 (1H2S),P2(1H)] and provided to the host system 120 in response to the read memory request. In other examples, the entire second version of the second codeword [U(1H2S),P1 (1H2S),P2(1H)] is provided to the host system 120.

If the second-level LDPC decoder is unable to correct the errors of the second version of the second codeword [U(1H2S),P1(1H2S),P2(1H)] within a semi-deep enhanced decoder threshold (e.g., a maximum number of iterations), the enhanced error-handling algorithm 121 activates a third-tier of error-handling operations (alternatively referred to as deep enhanced error-handling operations), and executes a soft read of the extra parity portion [P2(1H2S)], and the enhanced error-handling algorithm 121 forms a third version of the second codeword [U(1H2S),P1(1H2S),P2(1H2S)]. Thus, as demonstrated, in this version, the third version of the second codeword [U(1H2S),P1(1H2S),P2(1H2S)] is formed from soft reads (1H2S) of the first codeword [U(1H2S],P1(1H2S)] and the extra parity portion P2(1H2S). Additionally, the enhanced error-handling algorithm 121 assigns an LLR the bits of the third version of the second codeword [U(1H2S),P1(1H2S),P2(1H2S)].

The enhanced error-handling algorithm 121 inputs the third version of the second codeword [U(1H2S),P1(1H2S), P2(1H2S)] and the LLRs for the bits of the third version of the second codeword [U(1H2S),P1(1H2S),P2(1H2S)] as decoding parameters for the second-level LDPC decoder. In response, the second-level LDPC decoder attempts to decode and correct the errors of the third version of the second codeword [U(1H2S),P1(1H2S),P2(1H2S)] using the second H matrix. If the second-level LDPC decoder is able to correct the errors in the third version of the second codeword [U(1H2S),P1(1H2S),P2(1H2S)], the (corrected) second version of the second codeword [U(1H2S),P1 (1H2S),P2(1H)] is stored in the local memory 119. In this situation, the user data [U] can be extracted from the (corrected) third version of the second codeword [U(1H2S), P1(1H2S),P2(1H2S)] and provided to the host system 120 in response to the read memory request. In other examples, the entirety of the third version of the second codeword [U(1H2S),P1(1H2S),P2(1H2S)] is provided to the host system 120. If the second-level LDPC decoder is unable to correct the errors of the third version of the second codeword [U(1H2S),P1(1H2S),P2(1H2S)] within a deep enhanced decoding threshold (e.g., a maximum number of iterations), the memory read by the memory sub-system controller 115 is considered to have failed or other memory corrections are needed.

The implication of the described example through multiple tiers executed by the enhanced error-handling algorithm 121 ensures that hard reads (1H) of the first codeword [U,P(1)], and the extra parity portion [P2] are executed prior to soft reads (1H2S). Additionally, as explained, even in situations where a soft read (1H2S) of the first codeword [U(1H2S),P1(1H2S)] is needed, these soft reads (1H2S) are combined with a hard read (1H) of the extra parity portion [P2(1H)] to form the second version of the second codeword [U(1H2S),P1(1H2S),P2(1H)]. As noted, the first codeword [U,P1] is stored in a weak wordline, and in some examples, the extra parity portion [P2] is stored in a strong (or medium) wordline. Thus, the hard read (1H) of the extra parity portion [P2(1H)] is often sufficient to enable the second-level LDPC decoder to correct errors of the second version of the second codeword [U(1H2S),P1(1H2S),P2(1H)]. Accordingly, in these situations, the computational expensive associated with a soft read (1H2S) of the extra parity portion [P2 (1H2S)] is avoided. Therefore, by leveraging the error-handling algorithm 118 and the enhanced error-handling algorithm 121, the decode latency is decreased and throughput of the memory sub-system 110 can be increased, thereby improving the performance of the system 100.

Figure 1B:
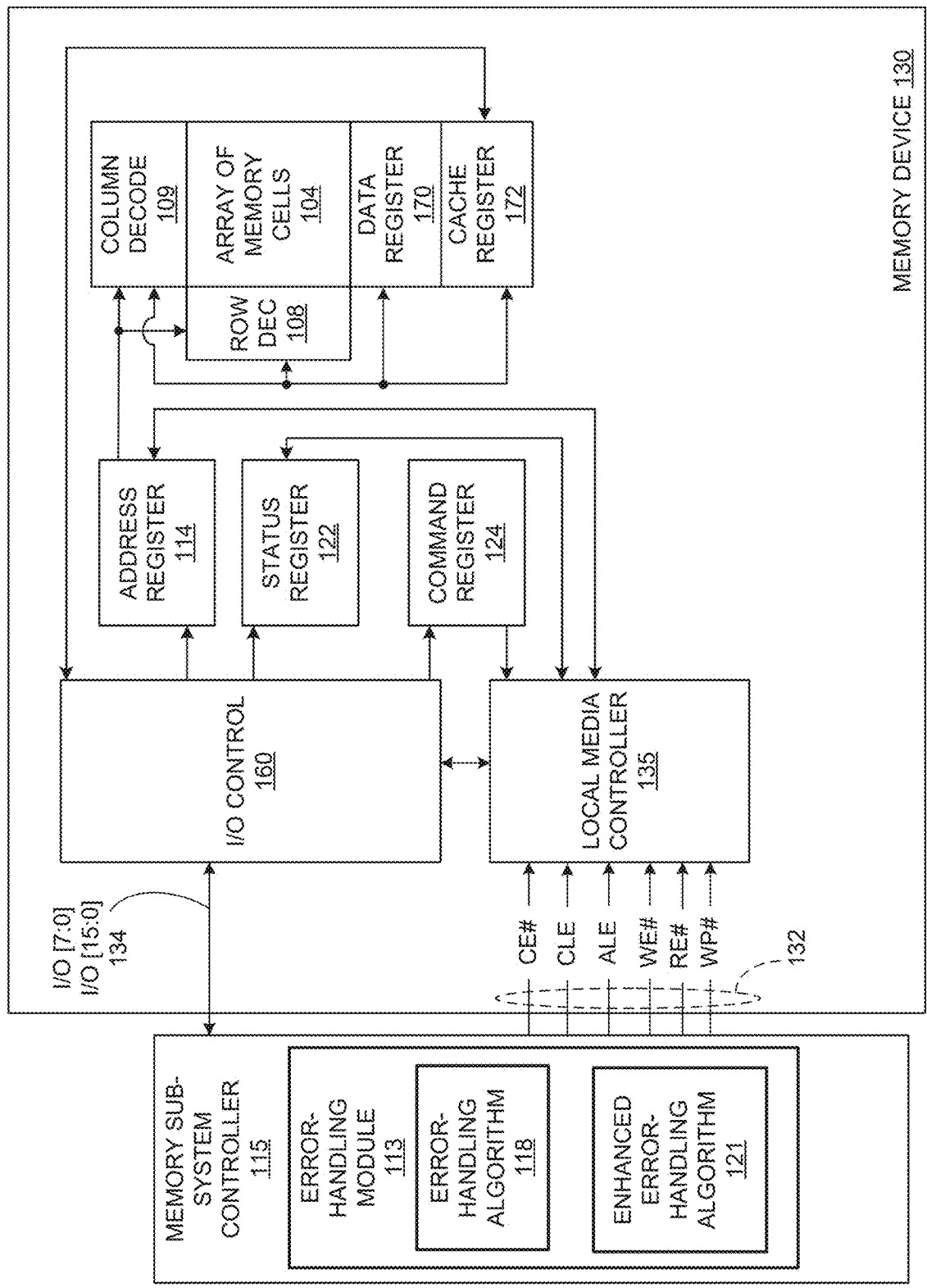
FIG. 1B illustrates a simplified block diagram of an example memory device in communication with a memory sub-system controller.

FIG. 1B illustrates a simplified block diagram of an example of a first apparatus, in the form of a memory device 130, in communication with an example of a second apparatus, in the form of a memory sub-system controller 115 of a memory sub-system (e.g., the memory sub-system 110 of FIG. 1A). Some examples of electronic systems include personal computers, personal digital assistants (PDAs), digital cameras, digital media players, digital recorders, games, appliances, vehicles, wireless devices, mobile telephones, etc. The memory sub-system controller 115 (e.g., a controller external to the memory device 130), can be a memory controller or other external host device.

The memory device 130 includes an array of memory cells 104 logically arranged in rows and columns. The memory cells 104 form a non-transitory computer-readable medium. Memory cells of a logical row are connected to the same access line (e.g., a wordline) while memory cells of a logical column are selectively connected to the same data line (e.g., a bit line) in some examples. In some examples, a single access line is associated with more than one logical row of memory cells and a single data line may be associated with more than one logical column. Memory cells (not shown in FIG. 1B) of at least a portion of the array of memory cells 104 are capable of being programmed to one of at least two target data states.

The memory device 130 includes row decode circuitry 108 and column decode circuitry 109 for decoding address signals. Address signals are received and decoded to access an array of memory cells 104 of the memory device 130. The memory device 130 also includes input/output (I/O) control circuitry 160 to manage input of commands, addresses and data to the memory device 130 as well as output of data and status information from the memory device 130. The memory device 130 has an address register 114 and is in communication with the I/O control circuitry 160, the row decode circuitry 108 and the column decode circuitry 109 to latch the address signals prior to decoding. The memory device 130 also includes a command register 124 in communication with the I/O control circuitry 160 and a local media controller 135 (e.g., the local media controller 135 of FIG. 1A) to latch incoming commands.

A controller (e.g., the local media controller 135 internal to the memory device 130) controls access to the array of memory cells 104 in response to the commands and generates status information for the external memory sub-system controller 115. For example, the local media controller 135 is configured to perform access operations (e.g., read operations, programming operations and/or erase operations) on the array of memory cells 104. The local media controller 135 is in communication with the row decode circuitry 108 and the column decode circuitry 109 to control the row decode circuitry 108 and the column decode circuitry 109 in response to the addresses.

The local media controller 135 is also in communication with a cache register 172. The cache register 172 latches data, either incoming or outgoing, as directed by the local media controller 135 to temporarily store data while the array of memory cells 104 is busy writing or reading, respectively, other data. During a program operation (e.g., write operation), data is passable from the cache register 172 to the data register 170 for transfer to the array of memory cells 104, and new data can be latched in the cache register 172 from the I/O control circuitry 160. During a read operation, data is passable from the cache register 172 to the I/O control circuitry 160 for output to the memory sub-system controller 115. New data is passable from the data register 170 to the cache register 172. The cache register 172 and/or the data register 170 form (e.g., or form a portion of) a page buffer of the memory device 130. The page buffer includes sensing devices (not shown in FIG. 1B) to sense a data state of a memory cell of the array of memory cells 104. For example, the sensing devices sense a state of a data line connected to that memory cell. The memory device 130 also includes a status register 122 in communication with the I/O control circuitry 160 and the local memory controller 135 to latch the status information for output to the memory sub-system controller 115.

The memory sub-system controller 115 includes the error-handling module 113. The error-handling module 113 executes the error-handling algorithm 118 and the enhanced error-handling algorithm 121 to correct data read from the memory device 130, including errors caused by weak word-lines.

The memory device 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE # and/or a write protect signal WP #. Additional or alternative control signals (not shown) can be further received over control link 132 depending upon the nature of the memory device 130. In some examples, the memory device 130 receives command signals (which represent commands), address signals (which represent addresses) and data signals (which represent data) from the memory sub-system controller 115 over a multiplexed input/output (I/O) bus 134 and outputs data to the memory sub-system controller 115 over the I/O bus 134.

In some examples, the commands are received over input/output (I/O) pins [7:0] of the I/O bus 134 at I/O control circuitry 160 and may then be written into the command register 124. The addresses are received over input/output (I/O) pins [7:0] of the I/O bus 134 at I/O control circuitry 160 and written into the address register 114. The data is receivable over input/output (I/O) pins [7:0] for an 8-bit device or input/output (I/O) pins [15:0] for a 16-bit device at I/O control circuitry 160 and is writable into the cache register 172. The data is subsequently written into the data register 170 for programming the array of memory cells 104 in some examples.

In some examples, the cache register 172 is omitted, and in such examples, the data is written directly into the data register 170. Additionally or alternatively, data is output over input/output (I/O) pins [7:0] for an 8-bit device or input/output (I/O) pins [15:0] for a 16-bit device. Moreover, it is noted that although reference is made to I/O pins, in other examples, a different conductive node providing for electrical connection to the memory device 130 by an external device (e.g., the memory sub-system controller 115), such as conductive pads or conductive bumps could be used in addition to or as a replacement for the I/O pins.

The example memory device 130 of FIG. 1B has been simplified. Moreover, in other examples, the functionality of the various block components described with reference to FIG. 1B are not segregated to distinct components or component portions of an integrated circuit device. For example, a single component or component portion of an integrated circuit device could be adapted to perform the functionality of more than one block component of FIG. 1B. Alternatively, components or component portions of an integrated circuit device could be combined to perform the functionality of a single block component of FIG. 1B. Additionally, while specific I/O pins are described in accordance with popular conventions for receipt and output of the various signals, it is noted that other combinations or numbers of I/O pins (or other I/O node structures) are useable in various examples.

Figure 2:
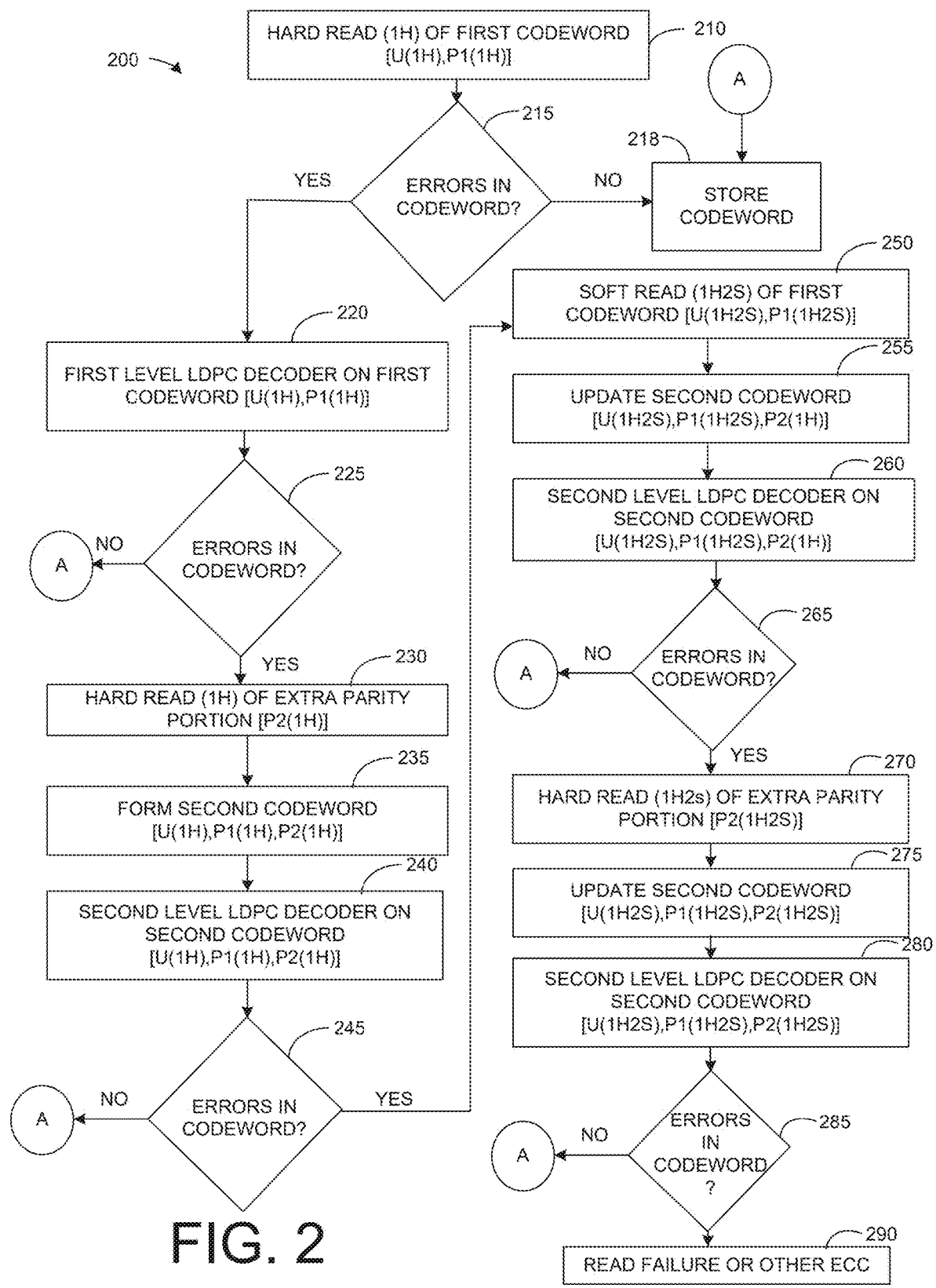
FIG. 2 illustrates a flowchart of an example method for decoding data.

FIG. 2 illustrates a flowchart of an example method 200 for decoding data. The method 200 can be implemented, for example, by a controller, such as the memory sub-system controller 115 of the system 100 of FIG. 1A. At block 210 the controller executes a hard read (1H) of a first codeword [U(1H),P1(1H)] that includes both user data [U] and a parity portion [P1]. For simplification, it is presumed that this hard read (1H) of the first codeword [U(1H),P1(1H)] is output from a weak wordline of a storage device (e.g., the memory device 130 or the memory device 140 of FIG. 1A), where the first codeword [U,P1] has been previously encoded with LDPC codes that include the parity bit codeword [P1] and an extra parity portion [P2] for error detection and correction. Additionally, the extra parity portion [P2] is stored in a strong (or medium) wordline of the memory device.

At block 215, an error-handling module (e.g., the error-handling module 113 of FIG. 1A) of the controller determines whether there are errors in the hard read (1H) of the first codeword [U(1H),P1(1H)]. To make this determination, the error-handling module multiplies the hard read (1H) of the first codeword [U(1H),P1(1H)] with a transpose of a first H matrix of a first-level LDPC code to provide a syndrome vector. This operation can also be performed without making a matrix multiplication by sequentially checking each parity using XOR operations. If the syndrome vector is zero, there are no errors in the hard read (1H) of the first codeword [U(1H),P1(1H)]. If the syndrome vector is non-zero, there is at least one error in the hard read (1H) of the first codeword [U(1H),P1(1H)], and the non-zero value of the syndrome vector is employable to identify check nodes that have failed parity checks. If the determination at block 215 is negative (e.g., NO), the method 200 proceeds to block 218. If the determination at block 215 is positive (e.g., YES), the method 200 proceeds to block 220.

At block 218, a codeword with no errors is stored in a local memory (e.g., the local memory 119) of the controller. The block 218 is reached when no errors are present in the first codeword [U,P1] or the second codeword [U,P1,P2] (depending on the situation), the first codeword [U,P1] or the second codeword [U,P1,P2] is the codeword stored in the local memory. The user data [U] extracted from the first codeword [U,P1] or the second codeword [U,P1,P2] can be output to an external system, such as a host (e.g., the host system 120 of FIG. 1A) in response to a read memory request.

At block 220 (reached when error(s) are detected in the codeword), the error-handling module executes an error-handling algorithm that inputs the hard read (1H) of the first codeword [U(1H),P1(1H)] into a first-level LDPC decoder. In response, the first-level LDPC decoder attempts to correct errors in the hard read (1H) of the first codeword [U(1H), P1(1H)] using the first H matrix until the errors are corrected or until a decoding threshold (in terms of number of iterations) is reached. At block 225, the error-handling module makes a determination as to whether errors still exist in the hard read (1H) of the first codeword [U(1H),P1(1H)]. If the determination at block 225 is negative (e.g., NO), the method 200 proceed to block 218 (through node 'A'). If the determination at block 225 is positive (e.g., YES), the method 200 proceeds to block 230.

At block 230, the error-handling module executes an enhanced error-handling algorithm that employs multitier error-handling techniques to correct the errors in the hard read (1H) of the first codeword [U(1H),P1(1H)]. More particularly, in a first-tier of enhanced error-handling operations (shallow enhanced error-handling operations), the enhanced error-handling algorithm causes the controller to execute a hard read (1H) of the extra parity portion [P2(1H)] and stores second level parities in local memory for possible use in later stages of error handling flow. At block 235, the enhanced error-handling algorithm combines the extra parity portion [P2(1H)] and the hard read (1H) of the first codeword [U(1H),P1(1H)] to form a first version of the second codeword [U(1H),P1(1H),P2(1H)]. At block 240, the enhanced error-handling algorithm continues the first-tier of enhanced error-handling and inputs the first version of the second codeword [U(1H),P1(1H),P2(1H)] into a second-level LDPC decoder. In response, the second-level LDPC decoder attempts to correct errors in the first version of the second codeword [U(1H),P1(1H),P2(1H)] using the second H matrix until the errors are corrected or until a shallow enhanced decoding threshold is reached. At block 245, the error-handling module makes a determination as to whether errors still exist in the first version of the second codeword [U(1H),P1(1H),P2(1H)]. If the determination at block 245 is negative (e.g., NO), the method 200 proceed to block 218 (through node 'A'). If the determination at block 225 is positive (e.g., YES), the method 200 proceeds to block 250.

At block 250, the enhanced error-handling algorithm executes a second-tier of enhanced error-handling operations (e.g., semi-deep enhanced error-handling operations) to correct errors in the second codeword [U,P1,P2]. More particularly, in the second-tier, the enhanced error-handling algorithm causes the controller to execute a soft read (such as 1H2S) of the first codeword [U(1H2S),P1(1H2S)]. At block 255, the enhanced error-handling algorithm combines the extra parity portion [P2(1H)] from local memory and the soft read (1H2S) of the first codeword [U(1H2S),P1(1H2S)] to update the first version of second codeword [U(1H),P1(1H),P2(1H)] to provide a second version of the second codeword [U(1H2S),P1(1H2S),P2(1H)]. At block 260, the enhanced error-handling algorithm inputs the second version of the second codeword [U(1H2S),P1(1H2S),P2(1H)] into the second-level LDPC decoder. Additionally, in this situation, the enhanced error-handling algorithm can assign LLRs to the soft bits of the second version of the second codeword [U(1H2S),P1(1H2S),P2(1H)]. Additionally, the enhanced error-handling algorithm can assign the hard bits of the second version of the second codeword [U(1H2S),P1(1H2S),P2(1H)] a hard input LLR, and input these assigned LLRs to the second-level LDPC decoder. In response, the second-level LDPC decoder attempts to correct errors in the second version of the second codeword [U(1H2S),P1(1H2S),P2(1H)] using the second H matrix until the errors are corrected or until a semi-deep enhanced decoding threshold is reached. At block 265, the error-handling module makes a determination as to whether errors still exist in the second version of the second codeword [U(1H2S),P1(1H2S),P2(1H)]. If the determination at block 265 is negative (e.g., NO), the method 200 proceed to block 218 (through node 'A'). If the determination at block 225 is positive (e.g., YES), the method 200 proceeds to block 270.

At block 270, the enhanced error-handling algorithm executes a third-tier of enhanced error-handling operations (e.g., deep enhanced error-handling operations) to correct errors in the second codeword [U,P1,P2]. More particularly, in the third-tier, the enhanced error-handling algorithm causes the controller to execute a soft read (1H2S) of the extra parity portion [P2(1H2S)]. At block 275, the enhanced error-handling algorithm combines the extra parity portion [P2(1H2S)] and the soft read (1H2S) of the first codeword [U(1H2S),P1(1H2S)] to update the second version of the second codeword [U(1H2S),P1(1H2S),P2(1H)] to a third version of the second codeword [U(1H2S),P1(1H2S),P2(1H2S)]. At block 280, the enhanced error-handling algorithm inputs the third version of the second codeword [U(1H2S),P1(1H2S),P2(1H2S)] into the second-level LDPC decoder. Additionally, in this situation, the enhanced error-handling algorithm can assign LLRs to the bits of the third version of the second codeword [U(1H2S),P1(1H2S),P2(1H2S)], and input these assigned LLRs into the second-level LDPC decoder. In response, the second-level LDPC decoder attempts to correct errors in the third version of the second codeword [U(1H2S),P1(1H2S),P2(1H2S)] using the second H matrix until the errors are corrected or until a deep enhanced decoding threshold is reached. At block 285, the error-handling module makes a determination as to whether errors still exist in the second codeword [U(1H),P1(1H),P2(1H2S)]. If the determination at block 285 is negative (e.g., NO), the method 200 proceed to block 218 (through node 'A'). If the determination at block 285 is positive (e.g., YES), the method 200 proceeds to block 290. At block 290, the controller determines that the read operation has failed or other error correction (ECC) operations are needed.

Figure 3:
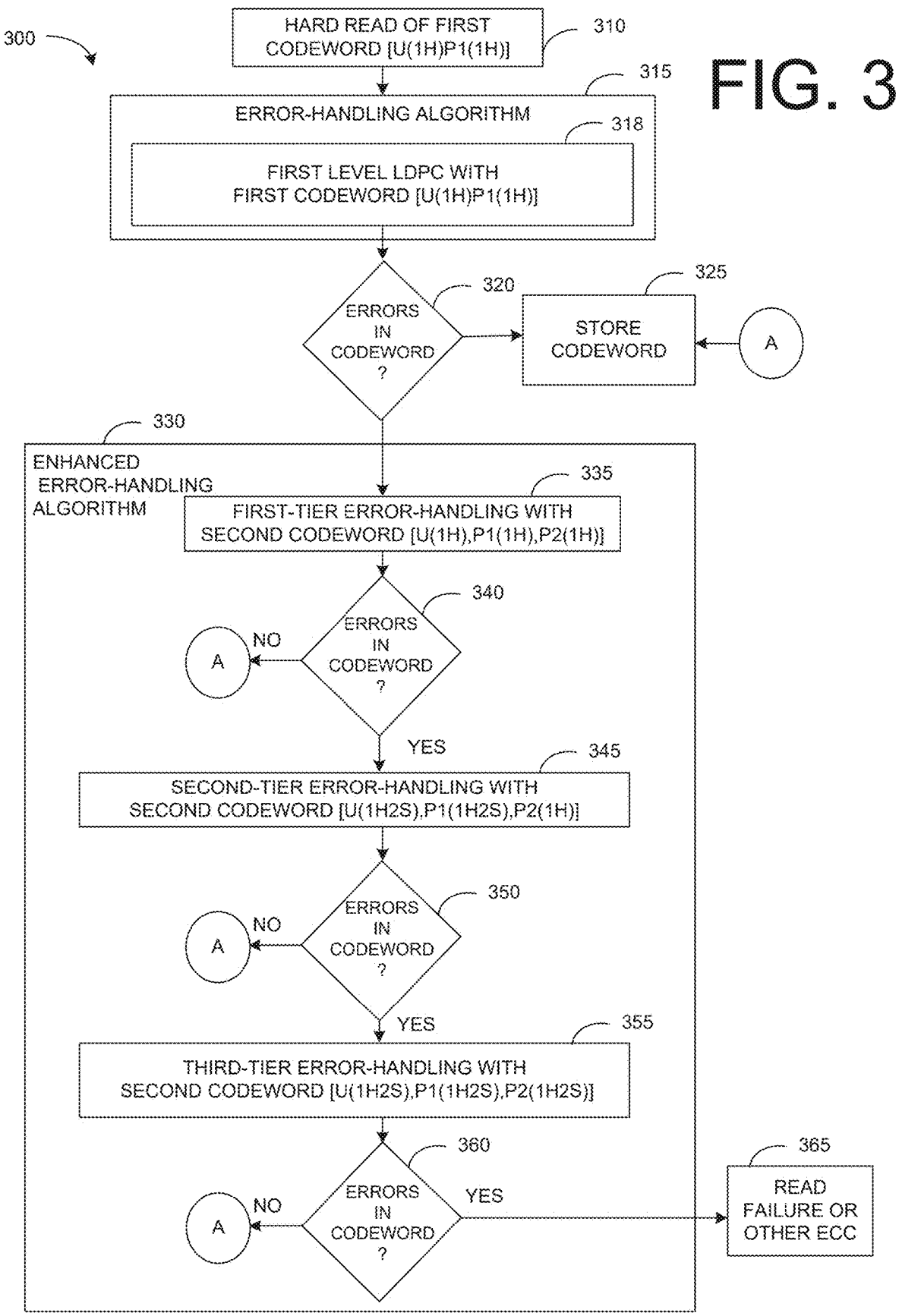
FIG. 3 illustrates a flowchart of an example method for decoding data.

FIG. 3 illustrates a flowchart of an example method 300 for decoding data. The method 300 can be implemented, for example, by a controller, such as the memory sub-system controller 115 of the system 100 of FIG. 1A. The flowchart of FIG. 3 provides a simplified description for operations of an error-handling algorithm (e.g., the error-handling algorithm 118 of FIG. 1A and an enhanced error-handling algorithm (e.g., the enhanced error-handling algorithm 121 of FIG. 1A) that are executed by an error-handling module of the controller, such as the error-handling module 113 of FIG. 1A. At block 310, the controller executes a hard read (1H) of a first codeword [U(1H),P1(1H)] stored in a weak wordline of a memory device (e.g., the memory device 130 or the memory device 140 of FIG. 1A). In the present example, it is presumed that the memory is non-volatile NAND memory, but in other examples, the memory could be a different type of non-volatile memory or the memory could be volatile memory. For purposes of simplification, it is presumed that the hard read of the first codeword [U(1H),P1(1H)] includes error(s). The first codeword is an LPDC codeword that includes both data [U] and a parity portion [P1] for error detection and correction.

At block 315, the error-handling module executes the error-handling algorithm. More specifically, in sub-block 318, the error-handling algorithm inputs the hard read (1H) of the first codeword [U(1H),P1(1H)] into a first-level LDPC decoder. In response, the first-level LDPC decoder attempts to decode the hard read (1H) of the first codeword [U(1H),P1(1H)] within a decoding threshold using a first H matrix. At block 320, the error-handling module makes a determination as to whether the hard read (1H) of the first codeword [U(1H),P1(1H)] still has errors (which indicates whether the first-level LDPC decoder decoded the error(s) of the hard read (1H) of the first codeword [U(1H),P1(1H)]). If the determination at block 320 is negative (e.g., NO), the method 300 proceeds to block 325. If the determination at block 320 is positive (e.g., YES), the method 300 proceeds to block 330.

At block 325, a codeword (the first codeword [U,P1] or the second codeword [U,P1,P2] without errors is stored in local memory (e.g., the local memory 119 of FIG. 1A) of the memory sub-system controller. User data [U] can be extracted from this codeword.

At block 330, the error-handling module activates the enhanced error-handling algorithm. At sub-block 335, the enhanced error-handling algorithm executes a first-tier of enhanced error-handling operations (e.g., shallow enhanced error-handling operations). In the first-tier of enhanced error-handling operations, the controller executes a hard read (1H) of an extra parity portion [P2(1H)] for the hard read (1H) of the first codeword [U(1H),P1(1H)]. The enhanced error-handling algorithm combines the extra parity portion [P2(1H)] with the hard read (1H) of the first codeword [U(1H),P1(1H)] to form a first version of the second codeword [U(1H),P1(1H),P2(1H)]. The enhanced-error-handling algorithm inputs the first version of the second codeword [U(1H),P1(1H),P2(1H)] into a second-level LDPC decoder, and the second-level LDPC decoder attempts to decode the first version of the second codeword [U(1H),P1(1H),P2(1H)] within a shallow enhanced decoding threshold using a second H matrix (which is more dense than the first H matrix). At sub-block 340, the error-handling module makes a determination as to whether the first version of the second codeword [U(1H),P1(1H),P2(1H)] still has error(s) (which indicates whether the second-level LDPC decoder corrected the error(s) of the first version of the second codeword [U(1H),P1(1H),P2(1H)]). If the determination at sub-block 340 is negative (e.g., NO), the method 300 proceeds to block 325 through node 'A'. If the determination at sub-block 340 is positive (e.g., YES), the method 300 proceeds to sub-block 345.

At sub-block 345, the enhanced error-handling algorithm executes a second-tier of enhanced error-handling operations (e.g., semi-deep enhanced error-handling operations). In the second-tier of enhanced error-handling operations, the controller executes a soft-read (such as 1H2S) of the first codeword [U(1H2S),P1(1H2S)]. The enhanced error-handling algorithm employs the soft read (1H2S) of the first codeword [U(1H2S),P1(1H2S)] and the extra parity portion [P1(1H)](executed with a hard read and stored in earlier operations), to form a second version of the second codeword [U(1H2S),P1(1H2S)],P2(1H)]. The enhanced error-handling assigns LLRs to the bits of the second version of the second codeword [U(1H2S),P1(1H2S),P2(1H)]. Additionally, the enhanced error-handling algorithm inputs the second version of the second codeword [U(1H2S),P1(1H2S),P2(1H)] and the assigned LLRs into the second-level LDPC decoder. The second-level LDPC decoder attempts to decode the second version of the second codeword [U(1H2S),P1(1H2S),P2(1H)] using the second H matrix before reaching the semi-deep enhanced decoding threshold. At sub-block 350, the error-handling module makes a determination as to whether the second codeword [U(1H2S),P1(1H2S),P2(1H)] still has error(s) (which indicates whether the second version of the second-level LDPC decoder corrected the error(s) of the first version of the second codeword [U(1H),P1(1H),P2(1H)]). If the determination at sub-block 350 is negative (e.g., NO), the method 300 proceeds to block 325 through node 'A'. If the determination at sub-block 350 is positive (e.g., YES), the method 300 proceeds to sub-block 355.

At sub-block 355, the enhanced error-handling algorithm executes a third-tier of enhanced error-handling operations (e.g., deep enhanced error-handling operations). In the third-tier error-handling, the controller executes a soft-read of the extra parity portion [P2(1H2S)]. The enhanced error-handling algorithm employs the soft read (1H2S) of the first codeword [U(1H2S),P1(1H2S)] and a soft read (1H2S) of the extra parity portion [P2(1H2S)] to form a third version of the second codeword [U(1H2S),P1(1H2S),P2(1H2S)]. The enhanced error-handling assigns LLRs to the bits of the third version of the second codeword [U(1H2S),P1(1H2S), P2(1H2S)]. Additionally, the enhanced error-handling algorithm inputs the third version of the second codeword [U(1H2S),P1(1H2S),P2(1H2S)] and the assigned LLRs into the second-level LDPC decoder. The second-level LDPC decoder attempt to decode the third version of the second codeword [U(1H2S),P1(1H2S),P2(1H2S)] within a deep enhanced decoding threshold using the second H matrix. At sub-block 360, the error-handling module makes a determination as to whether the third version of the second codeword [U(1H2S),P1(1H2S),P2(1H2S)] still has error(s) (which indicates whether the second-level LDPC decoder decoded the error(s) of the third version of the second codeword [U(1H),P1(1H),P2(1H2S)]). If the determination at sub-block 360 is negative (e.g., NO), the method 300 proceeds to block 325 through node 'A'. If the determination at sub-block 360 is positive (e.g., YES), the method 300 proceeds to block 365. At block 365, the read request fails or another error-handling operation is executed.

Figure 4:
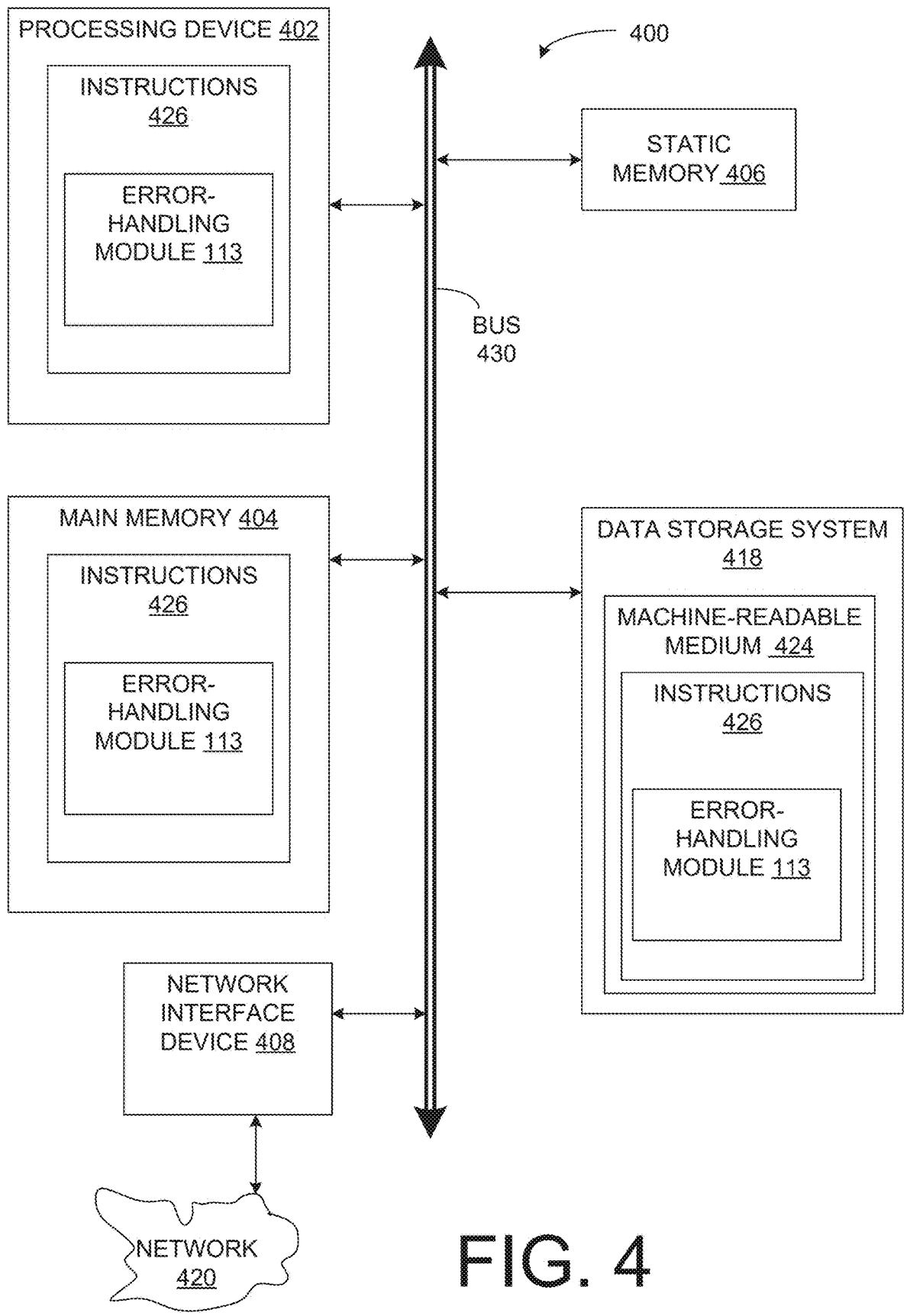
FIG. 4 illustrates an example of a computer system (a machine) in which examples of the present description may operate.

FIG. 4 illustrates an example machine of a computer system 400 (a machine) within which a set of instructions, for causing the machine to perform any one or more of the methodologies discussed herein, can be executed. In some examples, the computer system 400 corresponds to a host system (e.g., the host system 120 of FIG. 1A) that includes, is coupled to, or utilizes a memory sub-system (e.g., the memory sub-system 110 of FIG. 1A) or is used to perform the operations of a controller (e.g., to execute an operating system to perform operations corresponding to the error-handling module 113 of FIG. 1A). In other examples, the machine is connected (e.g., networked) to other machines in a LAN, an intranet, an extranet and/or the Internet. In various examples, the machine operates in the capacity of a server or a client machine in client-server network environment, as a peer machine in a peer-to-peer (or distributed) network environment or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge or any machine capable of executing a set of instructions (sequential or otherwise) that specify actions to be taken by that machine. In other examples, the machine may be a computer within an automotive, a data center, a smart factory, or other industrial application. Further, while a single machine is illustrated, the term "machine" shall also be taken to include any collection of machines that individually or jointly execute a set (or multiple sets) of instructions to perform the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM) or other non-transitory computer-readable media) and a data storage system 418, which communicate with each other via a bus 430.

The processing device 402 represents one or more general-purpose processing devices such as a microprocessor, a central processing unit, etc. More particularly, the processing device 402 can be a complex instruction set computing (CISC) microprocessor, reduced instruction set computing (RISC) microprocessor, very long instruction word (VLIW) microprocessor or a processor implementing other instruction sets or processors implementing a combination of instruction sets. In some examples, the processing device 402 is implemented with a special-purpose processing devices such as an application specific integrated circuit (ASIC), a field programmable gate array (FPGA), a digital signal processor (DSP), network processor, etc. The processing device 402 is configured to execute instructions 426 for performing the operations discussed herein. In some examples, the computer system 400 includes a network interface device 408 to communicate over the network 420.

The data storage system 418 includes a machine-readable storage medium 424 (also known as a computer-readable medium) that store sets of instructions 426 or software for executing the methodologies and/or functions described herein. The machine-readable storage medium 424 is a non-transitory medium. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418 and/or main memory 404 can correspond to the memory sub-system 110 of FIG. 1A. Accordingly, the machine-readable storage medium 424, the data storage system 418 and/or the main memory 404 are examples of non-transitory computer-readable media.

In some examples, the instructions 426 include instructions to implement functionality corresponding to the error-handling module 113 of FIG. 1A). While the machine-readable storage medium 424 is shown in an example to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared and otherwise manipulated. It has proven convenient at times, principally for reasons of common usage, to refer to these signals as bits, values, elements, symbols, characters, terms, numbers, etc.

It is noted, however, that all of these and similar terms are to be associated with the appropriate physical quantities and are merely convenient labels applied to these quantities. This description can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

This description also relates to an apparatus for performing the operations herein. This apparatus can be specially constructed for the intended purposes or this apparatus can include a general purpose computer selectively activated or reconfigured by a computer program stored in the computer. Such a computer program can be stored in a computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards or any type of media suitable for storing electronic instructions, each coupled to a computer system bus.

The algorithms and displays presented herein are not inherently related to any particular computer or other apparatus. Various general purpose systems can be used with programs in accordance with the descriptions herein, or it can prove convenient to construct a more specialized apparatus to perform the method. In addition, the present disclosure is not described with reference to any particular programming language. It will be appreciated that a variety of programming languages can be used to implement the teachings of the disclosure as described herein.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications and variations that fall within the scope of this application, including the appended claims. As used herein, the term "includes" means includes but not limited to, the term "including" means including but not limited to. The term "based on" means "based at least in part on". Additionally, where the disclosure or claims recite "a," "an," "a first" or "another" element, or the equivalent thereof, it should be interpreted to include one or more than one such element, neither requiring nor excluding two or more such elements.

What is claimed is:

1. A method for decoding data, comprising:
    determining by an error-handling module of a controller, that a hard read of a first codeword hard read from a first wordline has errors responsive to a first-level low density parity check (LDPC) decoder failing to correct the errors of the hard read of the first codeword;
    executing, by the controller, a hard read of a second wordline to provide a hard read of an extra parity portion for the first codeword;
    forming, by the error-handling module, a second codeword based on the hard read of the first codeword and the hard read of the extra parity portion, such that the second codeword has errors;
    inputting, by the error-handling module, the second codeword into a second-level LDPC decoder, wherein the second-level LDPC decoder attempts to decode the
second codeword in response to the inputting; and storing, by the error-handling module, a corrected codeword based on the second codeword in response to determining that the second codeword has no errors.

2. The method of claim 1, wherein the first wordline is a weak wordline and the second wordline is a strong wordline.

3. The method of claim 2, wherein the first wordline and the second wordline reside on different memory devices.

4. The method of claim 1, wherein the second codeword is a first version of the second codeword, the method further comprising:
- executing a soft read of the first codeword in response to determining that the second-level LDPC decoder was unable to correct the errors in the first version of the second codeword;
- updating the second codeword with the soft read of the first codeword and the hard read of the extra parity portion to provide a second version of the second codeword; and
- inputting, by the error-handling module in response to the updating, the second version of the second codeword into the second-level LDPC decoder, wherein the second-level LDPC decoder attempts to decode the second version of the second codeword in response to the inputting of the second version of the second codeword.

5. The method of claim 4, further comprising assigning of log-likelihood ratios (LLRs) to bits of the second version of the second codeword, wherein the assigned LLRs are also input into the second-level LDPC decoder.

6. The method of claim 5, wherein soft bits of the first codeword forming the second version of the second codeword are assigned the LLRs based on a reliability of a corresponding soft bit, and hard bits of the extra parity portion are assigned a hard input LLR.

7. The method of claim 4, further comprising:
- executing a soft read of the extra parity portion for the first codeword in response to determining that the second-level LDPC decoder was unable to correct the errors in the second version of the second codeword;
- updating the second version of the second codeword with the soft read of the extra parity portion to provide a third version of the second codeword; and
- inputting, by the error-handling module in response to the updating, the third version of the second codeword into the second-level LDPC decoder, wherein the second-level LDPC decoder attempts to decode the third version of the second codeword in response to the inputting of the third version of the second codeword.

8. The method of claim 7, further comprising assigning of log-likelihood ratios (LLRs) to bits of the third version of the second codeword, wherein the assigned LLRs are also input into the second-level LDPC decoder.

9. A system for decoding data stored in a memory device, comprising:
- a memory device; and
- a processing device coupled to the memory, the processing device to perform operations comprising:
  - determining by an error-handling module of a controller, that a hard read of a first codeword hard read from a first wordline has errors responsive to a first-level low density parity check (LDPC) decoder failing to correct the errors of the hard read of the first codeword;
  - executing, by the controller, a hard read of a second wordline to provide a hard read of an extra parity portion for the first codeword;
  - forming, by the error-handling module, a second codeword based on the hard read of the first codeword and the hard read of the extra parity portion, such that the second codeword has errors;
  - inputting, by the error-handling module, the second codeword into a second-level LDPC decoder, wherein the second-level LDPC decoder attempts to decode the second codeword in response to the inputting; and
  - storing, by the error-handling module, a corrected codeword based on the second codeword in response to determining that the second codeword has no errors.

10. The system of claim 9, wherein the first wordline is a weak wordline and the second wordline is a strong wordline.

11. The system of claim 10, wherein the first wordline and the second wordline reside on different memory devices.

12. The system of claim 9, wherein the second codeword is a first version of the second codeword, the operations further comprise:
- executing a soft read of the first codeword in response to determining that the second-level LDPC decoder was unable to correct the errors in the first version of the second codeword;
- updating the second codeword with the soft read of the first codeword and the hard read of the extra parity portion to provide a second version of the second codeword; and
- inputting, by the error-handling module in response to the updating, the second version of the second codeword into the second-level LDPC decoder, wherein the second-level LDPC decoder attempts to decode the second version of the second codeword in response to the inputting of the second version of the second codeword.

13. The system of claim 12, wherein the operations further comprise assigning of log-likelihood ratios (LLRs) to bits of the second version of the second codeword, wherein the assigned LLRs are also input into the second-level LDPC decoder.

14. The system of claim 12, wherein the operations further comprise:
- executing a soft read of the extra parity portion for the first codeword in response to determining that the second-level LDPC decoder was unable to correct the errors in the second version of the second codeword;
- updating the second version of the second codeword with the soft read of the extra parity portion to provide a third version of the second codeword; and
- inputting, by the error-handling module in response to the updating, the third version of the second codeword into the second-level LDPC decoder, wherein the second-level LDPC decoder attempts to decode the third version of the second codeword in response to the inputting of the third version of the second codeword.

15. A non-transitory computer-readable storage medium comprising instructions that, when executed by a processing device, cause the processing device to perform operations comprising:
- determining by an error-handling module of a controller, that a hard read of a first codeword hard read from a first wordline has errors responsive to a first-level low density parity check (LDPC) decoder failing to correct the errors of the first codeword;
- executing, by the controller, a hard read of a second wordline to provide a hard read of an extra parity portion for the first codeword;
- forming, by the error-handling module, a second codeword based on the hard read of the first codeword and the hard read of the extra parity portion, such that the second codeword has errors;

inputting, by the error-handling module, the second codeword into a second-level LDPC decoder, wherein the second-level LDPC decoder attempts to decode the second codeword in response to the inputting; and storing, by the error-handling module, a corrected codeword based on the second codeword in response to determining that the second codeword has no errors.

16. The non-transitory computer-readable storage medium of claim 15, wherein the first wordline is a weak wordline and the second wordline is a strong wordline.

17. The non-transitory computer-readable storage medium of claim 16, wherein the first wordline and the second wordline reside on different memory devices.

18. The non-transitory computer-readable storage medium of claim 15, wherein the second codeword is a first version of the second codeword, the operations further comprise:

executing a soft read of the first codeword in response to determining that the second-level LDPC decoder was unable to correct the errors in the first version of the second codeword;

updating the second codeword with the soft read of the first codeword and the hard read of the extra parity portion to provide a second version of the second codeword; and inputting, by the error-handling module in response to the updating, the second version of the second codeword into the second-level LDPC decoder, wherein the second-level LDPC decoder attempts to decode the second version of the second codeword in response to the inputting of the second version of the second codeword.

19. The non-transitory computer-readable storage medium of claim 18, wherein the operations further comprise:

executing a soft read of the extra parity portion for the first codeword in response to determining that the second-level LDPC decoder was unable to correct the errors in the second version of the second codeword;

updating the second version of the second codeword with the soft read of the extra parity portion to provide a third version of the second codeword; and inputting, by the error-handling module in response to the updating, the third version of the second codeword into the second-level LDPC decoder, wherein the second-level LDPC decoder attempts to decode the third version of the second codeword in response to the inputting of the third version of the second codeword.

20. The non-transitory computer-readable storage medium of claim 19, further comprising assigning of log-likelihood ratios (LLRs) to bits of the third version of the second codeword, wherein the assigned LLRs are also input into the second-level LDPC decoder.

* * * * *